US 11,519,485 B2

(12) United States Patent
Furuya et al.

(10) Patent No.: US 11,519,485 B2
(45) Date of Patent: Dec. 6, 2022

(54) LOCK-UP CLUTCH FOR TORQUE CONVERTER

(71) Applicants: UNIPRES CORPORATION, Yokohama (JP); JATCO Ltd, Fuji (JP); NISSAN MOTOR CO., LTD., Yokohama (JP)

(72) Inventors: Nobuhiko Furuya, Fuji (JP); Ryuta Mori, Fuji (JP); Mitsuyoshi Tako, Fuji (JP); Daisuke Nakahara, Fuji (JP); Koshi Asao, Fuji (JP); Daisuke Usui, Fuji (JP); Takumi Watanabe, Fuji (JP); Yasuhiro Ishikawa, Fuji (JP)

(73) Assignees: UNIPRES CORPORATION, Yokohama (JP); JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/270,545

(22) PCT Filed: Aug. 23, 2019

(86) PCT No.: PCT/JP2019/032988
§ 371 (c)(1),
(2) Date: Feb. 23, 2021

(87) PCT Pub. No.: WO2020/050056
PCT Pub. Date: Mar. 12, 2020

(65) Prior Publication Data
US 2021/0215239 A1 Jul. 15, 2021

(30) Foreign Application Priority Data
Sep. 3, 2018 (JP) .............................. JP2018-164115

(51) Int. Cl.
*F16H 45/02* (2006.01)

(52) U.S. Cl.
CPC ...... *F16H 45/02* (2013.01); *F16H 2045/0205* (2013.01); *F16H 2045/0215* (2013.01); *F16H 2045/0284* (2013.01)

(58) Field of Classification Search
CPC ...... F16H 45/02; F16H 2045/0205–021; F16H 2045/0273–0294
See application file for complete search history.

(56) References Cited

U.S. PATENT DOCUMENTS

| 6,938,743 B2 * | 9/2005 | Arhab | F16H 45/02 |
| | | | 192/3.29 |
| 6,938,744 B2 * | 9/2005 | Tomiyama | F16H 45/02 |
| | | | 192/3.29 |

(Continued)

FOREIGN PATENT DOCUMENTS

| DE | 102012221411 A1 * | 6/2013 | ............. F16H 41/24 |
| JP | 2002-195378 A | 7/2002 | |

(Continued)

OTHER PUBLICATIONS

International Search Report with English translation and Written Opinion issued in corresponding application No. PCT/JP2019/032988 dated Oct. 8, 2019.

*Primary Examiner* — David R Morris
*Assistant Examiner* — James J Taylor, II
(74) *Attorney, Agent, or Firm* — Foley & Lardner LLP

(57) ABSTRACT

The present invention relates to a lock-up clutch of a torque converter. A cover (10) is separated to a pilot (48) and includes an opening (10-1) for installing the pilot (48). Before assembling a clutch driving portion such as a piston, a separator, drive plates, a seal ring, and driven plates, to the pilot (48), rivets (53) are press-fitted into the pilot (48), the cover (10) is abutted to respective head portions of the rivets (53), and the pilot (48) is installed in the cover (10) and is fixed to the cover (10) by welding. Thereafter, the piston, the (Continued)

drive plates and the driven plates are disposed between the separator and the cover (10), the seal ring is contact with the separator, the separator is press-fitted into projection ends of the rivets (53), and then projection portions (53-2) of the rivets (53) are crimped.

12 Claims, 12 Drawing Sheets

(56) References Cited

U.S. PATENT DOCUMENTS

| | | | |
|---|---|---|---|
| 8,727,087 B2 * | 5/2014 | Fambach | F16H 45/02 |
| | | | 192/3.3 |
| 10,527,145 B2 * | 1/2020 | Li | F16H 45/02 |
| 2008/0229570 A1 | 9/2008 | Koppitz | |

FOREIGN PATENT DOCUMENTS

| | | |
|---|---|---|
| JP | 2008-538232 A | 10/2008 |
| JP | 5835391 B2 | 12/2015 |
| WO | WO-2009/049741 A1 | 4/2009 |

\* cited by examiner

_US 11,519,485 B2_

LOCK-UP CLUTCH FOR TORQUE CONVERTER

TECHNICAL FIELD

The present invention relates to a lock-up clutch for a torque converter, in particular to a fixed structure of a piston guide member (a pilot) by utilizing rivets.

BACKGROUND ART

A multi-plate type clutch including plural disk-shape drive plates and plural disk-shape driven plates, which use independent hydraulic pressure sources and are alternately arranged, is known as a lock-up device of a torque converter. In such a lock-up device, a piston for driving a clutch plate is annularly formed and is slidably attached in an axial direction on a piston guide member, which is coaxial with a rotational axis, with an oil-tight state, and the piston guide member includes a hydraulic pressure introduction hole for driving the piston. It is required that the piston guide member is strongly fixed to a cover in both rotational and axial directions so that the piston guide member sufficiently withstands an engagement force of the clutch. Therefore, plural rivets as a fixing means are arranged in a circumferential direction and are welded to the cover (Patent Document 1). In technique of Patent Document 1, the rivets are inserted into the piston guide member via a clutch receiving plate, which is opposite to a piston via an outer circumferential portion of the piston guide member (flange portion), and respective tips of the rivets from the piston guide member are welded to a cover opposite surface. The device of Patent Document 1 has a configuration in which the rivets are welded to the cover at a rivet end face. Patent Document 1 does not describe a weld method, but it is considered that a projection welding is employed as a welding method.

The fixing method by the projection welding in which the piston guide member is welded to the cover is described in Patent Document 2 in detail by the same applicant who filed the patent application according to Patent Document 1. Patent Document 3 describes a structure in which the device comprises the bottomed cylindrical-shape piston guide member, the cover has an opening in a center, the entire outer circumference of the piston guide member is welded to the cover along the opening, and the piston is driven toward the cover by the hydraulic pressure during a clutch engagement. The above structure relates to carrying out the present invention.

THE LIST OF PRIOR ART DOCUMENTS

Patent Documents

Patent Document 1: WO 2009/049741 A1
Patent Document 2: Japanese Unexamined Patent Publication No. 2008-538232 A
Patent Document 3: Japanese Patent No. 5835391 B2

SUMMARY OF THE INVENTION

Problems to be Solved by the Invention

In the projection welding, since the heat due to an electrical resistor is concentrated to a welded portion, the projection welding is performed under quite high temperature. It is concerned that a seal ring, which is installed for maintaining the oil-tightness at the sliding portion between the piston guide member and the piston and is a poor heat resistant component, is thermally damaged due to heat conduction from such the high temperature. Therefore, it is essential for the seal ring to perform a countermeasure for preventing the thermal damage. As the countermeasure for preventing the thermal damage of the seal ring, it is considered that the heat conduction to the seal ring is interrupted or is reduced by being a rivet diameter small than a rivet hole diameter and having a clearance. Such a countermeasure causes disadvantages (an increase in the number of the components, an increase in the manufacturing man-hours and an increase in a size of the torque converter) in which, for maintaining the required welding-fixing strength of the piston guide member to the cover, the number of the rivets is increased, the outer diameter of the piston guide member at the installing point of the rivet is increased and the like.

The present invention has been developed in view of the above-described problems of the prior art, and an object of the present invention is to provide a fixed structure that has the fastened structure by using the rivets and enables to maintain the strong fixed state of the piston guide member to the cover without having the above problems.

Means for Solving the Problems

The present invention relates to a lock-up clutch for a torque converter that is installed in a closed chamber which is defined by an impeller shell of the torque converter and a cover, which is fixed to the impeller shell and integrally rotates with an engine output axis, and circulates power transmission oil, and transfers a rotation of the engine output axis to an input axis side of a transmission in bypassing the torque converter, comprising: a piston; first friction plates that integrally rotate with the cover; second friction plates that are integrally and rotatably coupled to the input axis side of the transmission, are opposite to the first friction plates in an axial direction, and are not engaged with the first friction plates in a normal state; an annular hydraulic pressure chamber that integrally rotates with the cover, is formed on one surface of the piston, and urges the first and second friction plates against one another to be a friction engagement state by driving the piston by means of hydraulic pressure; a piston guide member that integrally rotates with the cover, is a cylindrical shape, and forms oil holes which slidably guide the piston in an axial direction at an inner circumferential portion thereof, and are communicated the annular hydraulic pressure chamber with a hydraulic pressure source; a seal ring that is in close contact with the piston and the piston guide member; a friction-engagement reaction force receiving member that rotates with the cover, is a cylindrical shape, is opposite to the cover sandwiching the piston, the seal ring, the first and second friction plates, and receives a friction-engagement reaction force between the first and second friction plates in cooperation with the cover when the piston is driven by the hydraulic pressure in the hydraulic pressure chamber; and fastening members that are plurally disposed in a circumferential direction with an interval, and are fixed with the piston guide member and the friction-engagement reaction force receiving member by crimping.

The piston is driven toward the cover by the hydraulic pressure of the hydraulic pressure chamber, resulting in enabling to have the friction-engagement force. In this case, there is provided a separator that is a slidable cylindrical member which is oil-tight by the seal ring in the piston and the outer circumference, and forms the hydraulic pressure chamber by the piston and the piston guide member. The separator serves as the friction-engagement reaction force receiving member according to the present invention.

There are provided the rivets that serve as the fastening members. The rivets are press-fitted from the cover into the piston guide member and the separator, and respective projection ends of the rivets from the separator are crimped, thereby enabling to obtain the strong fixed state of the piston guide member and the separator to the cover.

The piston guide member has a closed shape at an engine side end, and enables to have a welded structure in entire circumferences of the opening of the cover and the engine side end so as to form the oil-tight space.

Effects of the Invention

Since the components are fixed by crimping, it is not concerned that thermal deterioration is occurred in the seal member that is disposed at the piston sliding portion of the piston guide member. Because the fastened structure in which the rivets are used is employed and no clearance between the fastening members and the piston guide member can be realized, without increasing the rivet diameter and the number of the rivets, the diameter of the piston guide member is not be changed by even using the smaller number of the rivets and the smaller rivet diameter. Even if the diameter of the piston guide member is to be smaller, the strong fixed state between the piston guide member (the pilot) and the friction-engagement reaction force receiving member (the separator) is realized, the component cost and the man-hour cost is not increased, and the size of the torque converter is not increased. That is, the friction-engagement reaction force receiving member (the separator) faces the cover, and the piston, the seal ring and the first and second friction plates are disposed between the friction-engagement reaction force receiving member (the separator) and the cover. Thus, the friction-engagement reaction force receiving member (the separator) and the cover sandwich and fix other members such as the piston and the seal ring. As in a conventional method, in a case of using the heat by means of welding when fixing the friction-engagement reaction force receiving member (the separator) to the piston guide member (the pilot), the heat is conducted to the seal ring via the friction-engagement reaction force receiving member (the separator) and the piston guide member (the pilot), resulting in occurring the above problems such as thermally damaging the seal ring. In contrast, by employing the method in which the friction-engagement reaction force receiving member (the separator) is fixed to the piston guide member (the pilot) by crimping without using the heat, the heat is not conducted to the seal ring and the strong fixed state can be realized.

MODE FOR CARRYING OUT THE INVENTION

Figure 1:
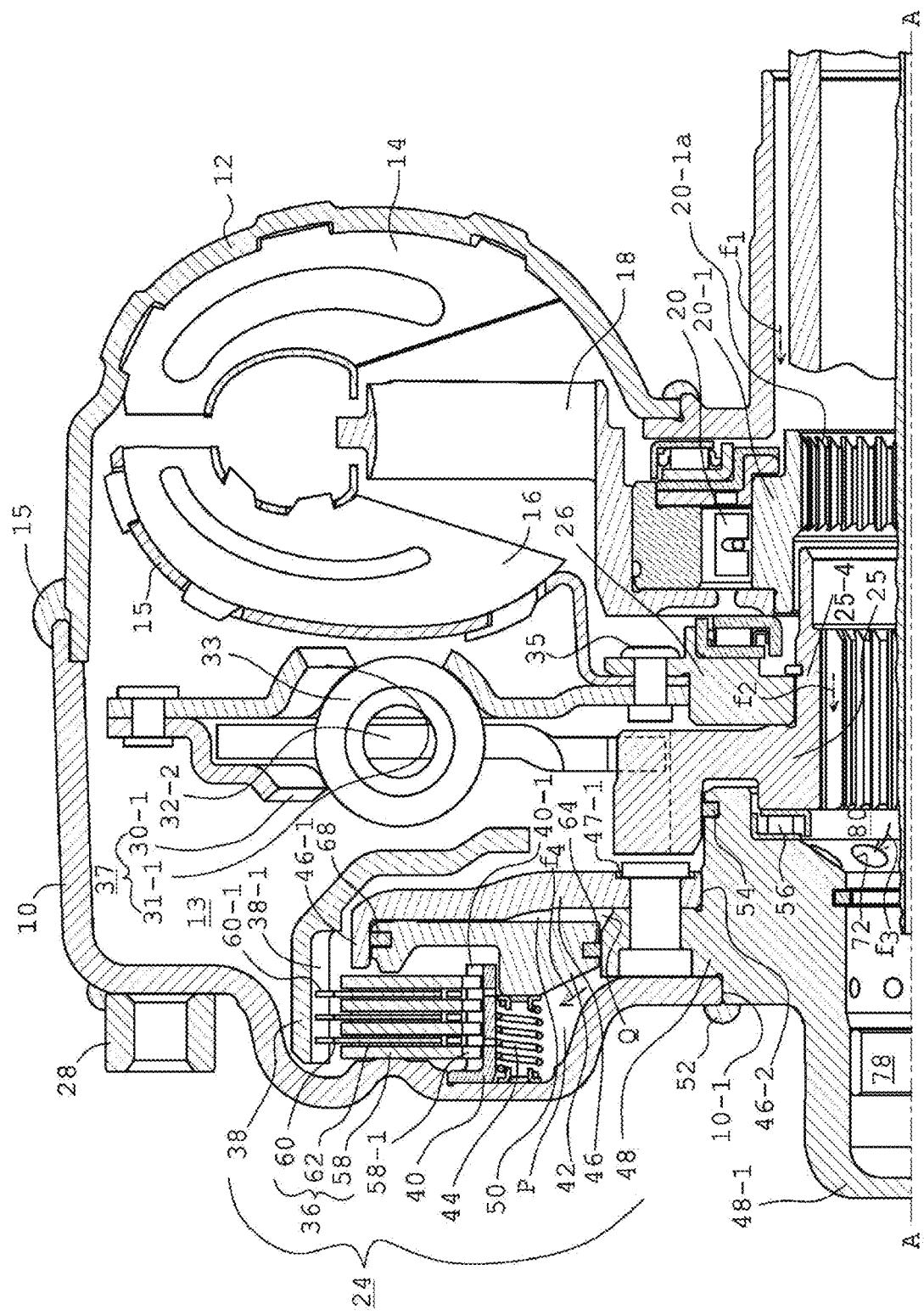
FIG. 1 is a vertical cross-sectional view showing a torque converter according to the present invention and showing an upper portion of the torque converter along an axial central line A-A.
Figure 2:
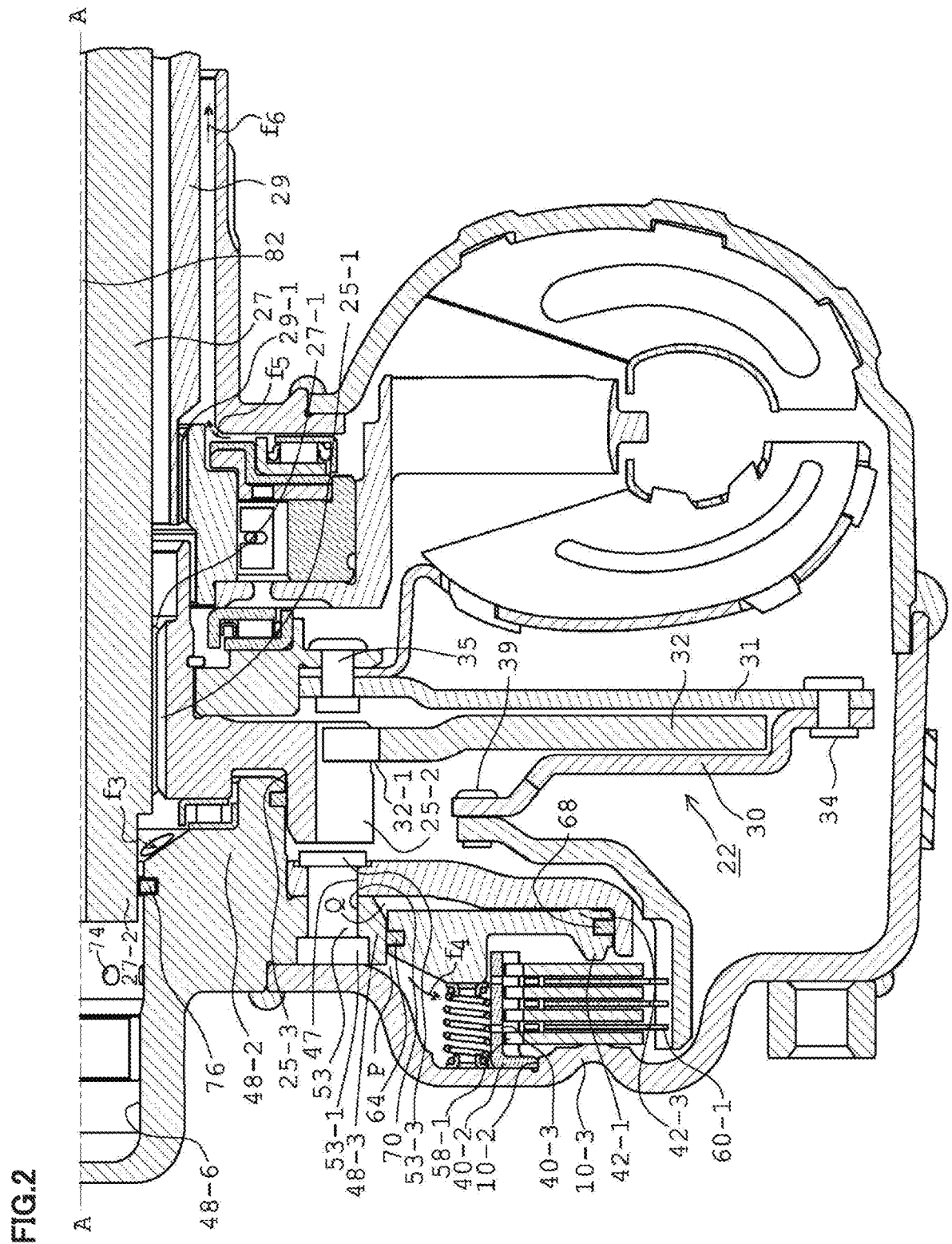
FIG. 2 is a vertical cross-sectional view showing a torque converter according to the present invention and showing a lower portion of the torque converter along the axial central line A-A.

FIGS. 1 and 2 show an upper cross-section and a lower cross-section of a torque converter along a center of an axis, respectively (FIG. 1 shows an upper portion of the torque converter along the central line A-A and FIG. 2 shows a lower portion of the torque converter along the central line A-A). Hereinafter, when referring to FIGS. 1 and 2, FIGS. 1 and 2 are called as a general view of the torque converter. An impeller shell 12 is fixed to a cover 10 by welding (the reference numeral 15 denotes a welded portion). A pump impeller 14, a turbine shell 15, a turbine blade 16, a stator 18, a one-way clutch 20, which are well-known basic components of the torque converter, a torsional dumper 22 and a lock-up clutch 24 are installed in the closed chamber 13 that is formed by the cover 10 and the impeller shell 12. Torque converter oil is circulated in the closed chamber and is also used as clutch oil for lubrication and cooling of a clutch pack described below of a lock-up clutch.

In the present embodiment, the cover 10 includes an opening 10-1 with an axial center. A pilot 48 described below is welded (a welded portion 52) in an entire circumference at the opening 10-1, resulting in maintaining oil-tightness of the closed chamber 13.

A hub damper 25 is disposed in a central portion of the closed chamber 13 and a turbine hub 26 is fitted into a boss 25-4 of the hub damper 25. A spline hole 25-1 is formed on the hub damper 25 with the axial center and a spline 27-1, which is disposed at one end of a transmission input axis 27, is fitted into the spline hole 25-1. A boss nut 28 is fixed to an outer surface of an engine side of the cover 10 by welding, a drive plate (not shown), which is coupled to a crank shaft of the engine (an engine motor of the present invention), is fixed to the boss nut 28 with a bolt (not shown), and the cover 10 integrally rotates with the crank shaft of the engine. As well-known, the transmission input axis 27 is inserted into a stator shaft 29, which is spline-fitted into a spline hole 20-1a whose tip is an inner race 20-1 of the one-way clutch 20. The reference numeral 29-1 denotes an outer circumferential spline of the stator shaft 29 which is fitted into the spline hole 20-1a.

In the present embodiment, the torsional damper 22 includes a drive plate 30, a sub plate 31, a hub plate 32 and coil springs 33. The drive plate 30 is coupled to the sub plate 31 in an outer circumference by rivets 34. As described below, the drive plate 30 and the sub plate 31 are coupled at the lock-up clutch 24 side. As well-known, the drive plate 30 is opposite to the sub plate 31 in an axial direction. The drive plate 30 and the sub plate 31 have plural coil spring receiving portions 37 in a circumferential direction with an interval. The coil spring receiving portions 37 on the drive plate 30 have a molded portion 30-1, those on the sub plate 31 have a molded portion 31-1, and the molded portions 30-1 and 31-1 are oppositely protruded with one another. In a neutral state that relative rotation between an input and an output is not existed, the coil springs 33 are received in a regular position of the respective coil spring receiving portions 37 with a setting load. The hub plate 32 of the present invention has a well-known structure, circumferential direction projections 32-1 which are disposed on an inner circumference of the hub plate 32 are engaged with circumferential direction grooves 25-2 which are disposed on an outer circumference of the hub damper 25, and the hub plate 32 is rotatably coupled to the transmission input axis side. The hub plate 32 has driving portions 32-2 in which each of the driving portions 32-2 extends a portion between ends of the coil springs 33, which are separately adjacent in a circumferential direction on an outer circumference, in a radial direction. In a neutral state that no rotational fluctuation is existed, the respective coil springs 33 are positioned at a rotational angle which is coincident with the corresponding coil spring receiving portion 37, and the setting load is applied to the respective coil springs 33. The torsional damper 22 performs an operation for absorbing the rotational fluctuation of the engine by elastic deformation of the coil springs 33. That is, in the respective coil spring receiving portions 37 (the molded portions 30-1 and 31-1), the driving portions 32-2 of the hub plate 32 elastically deform the coil springs 33 between the ends of the opposite coil spring receiving portions in the rotational fluctuation direction by compression depending on the rotational fluctuation direction of the engine, which is deviated from the neutral state. Thereby, absorbing the rotational fluctuation by means of the elastic force, which is a well-known function, is achieved. The sub plate 31 is coupled to a turbine shell 15 and the hub damper 26 by the rivets 34. The rivets 34 are made of a steel material, aluminum and a suitable metal material having ductility and the reference numeral 53-1 denotes an expanded head portion of the rivets 34.

Figure 3:
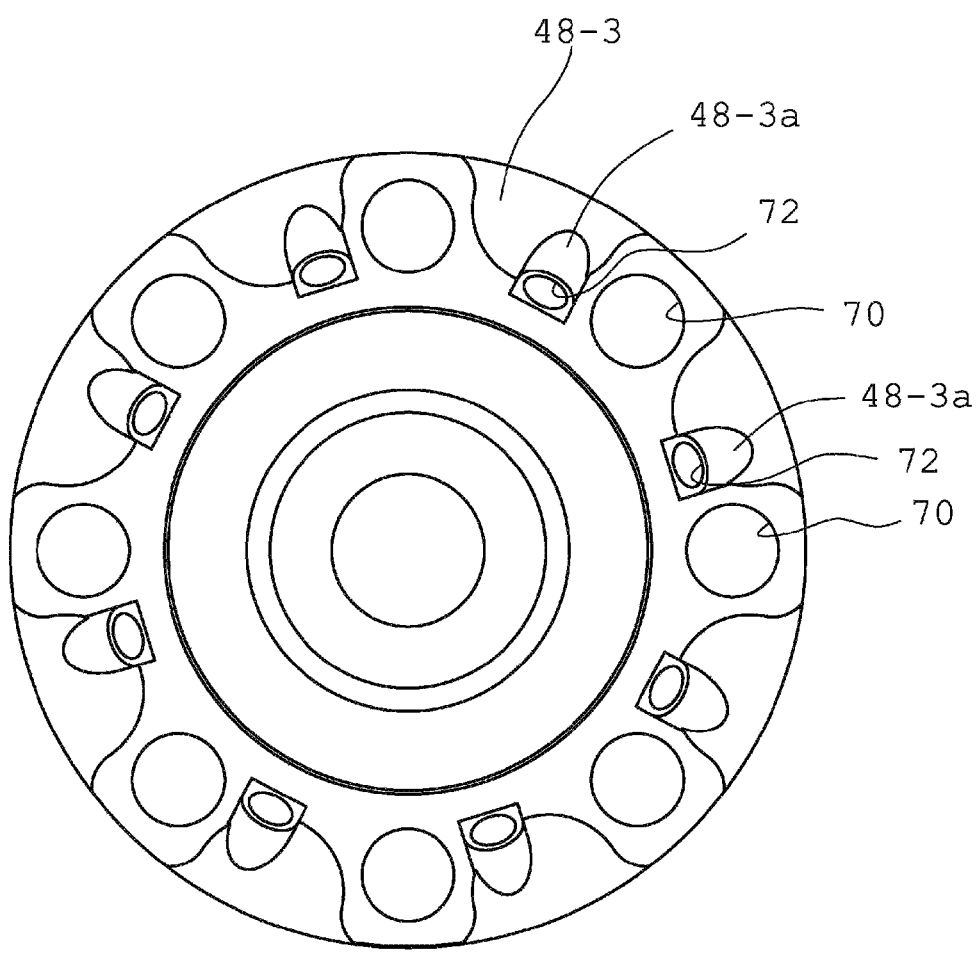
FIG. 3 is a frontal view of a pilot (an arrow view seen from an arrow III of FIG. 5)
Figure 4:
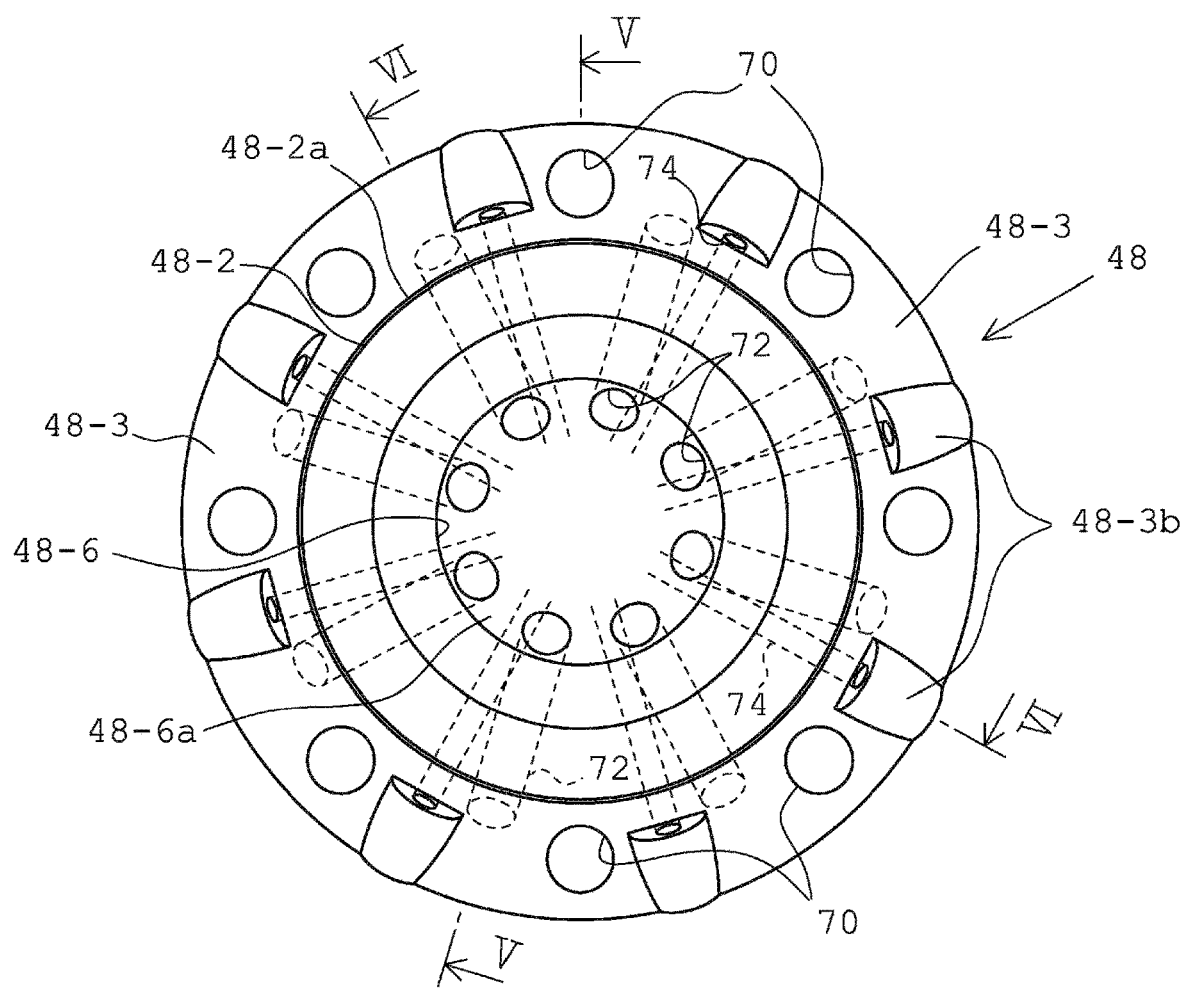
FIG. 4 is a back view of the pilot (an arrow view seen from an arrow IV of FIG. 5)
Figure 5:
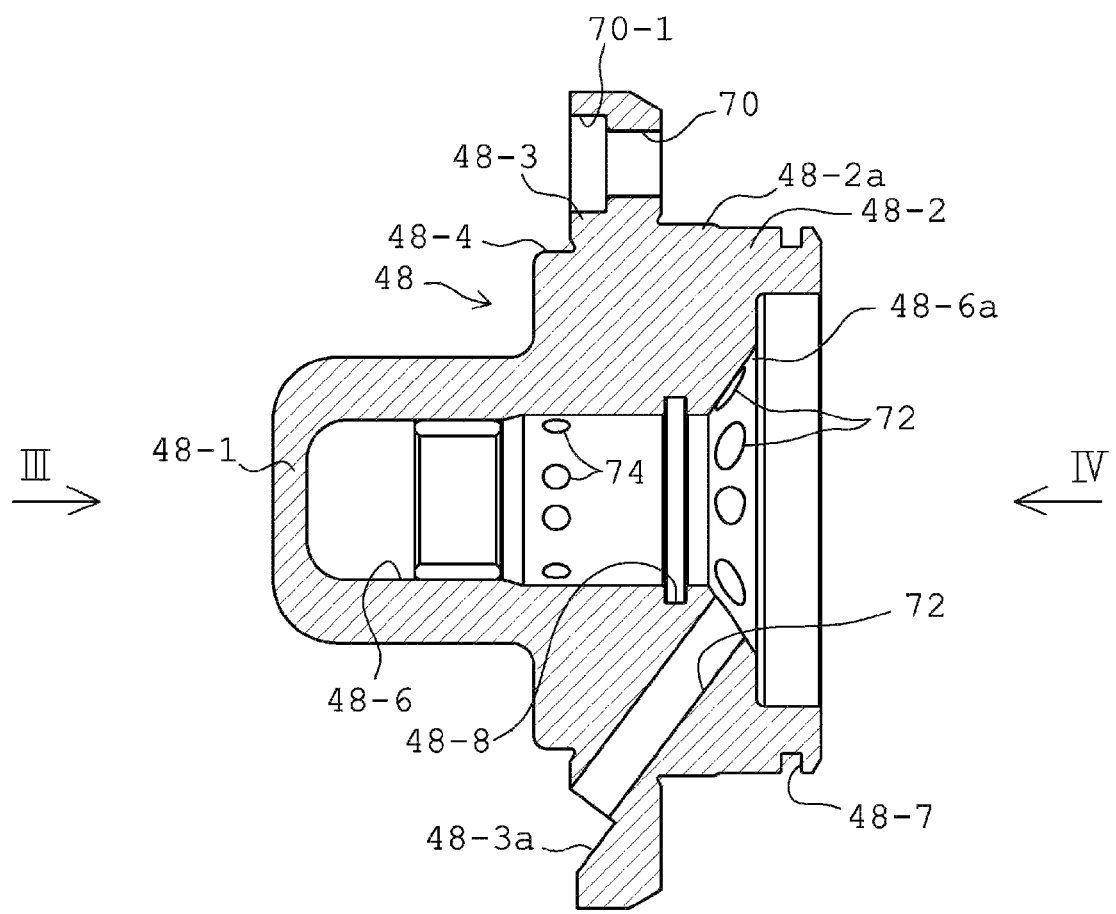
FIG. 5 is a vertical cross-sectional view of the pilot (an arrow cross-sectional view taken along a line V-V of FIG. 4)
Figure 6:
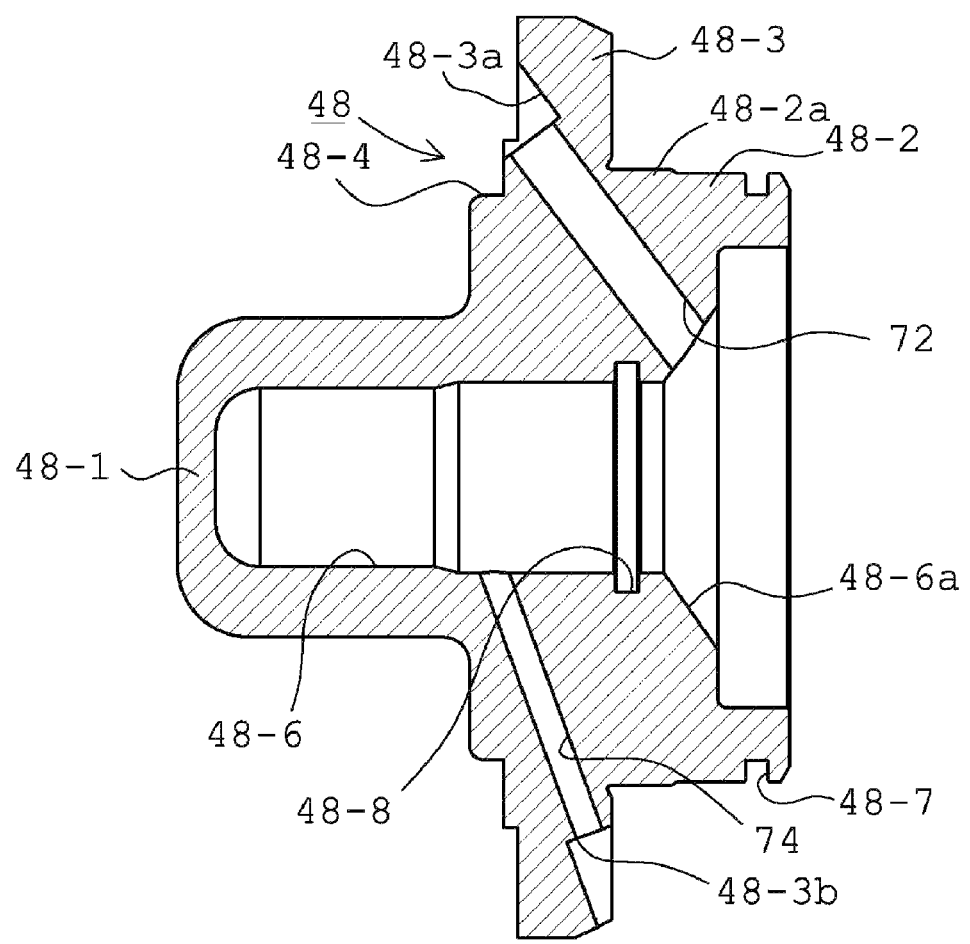
FIG. 6 is another vertical cross-sectional view of the pilot (an arrow cross-sectional view taken along a line VI-VI of FIG. 4)
Figure 7:
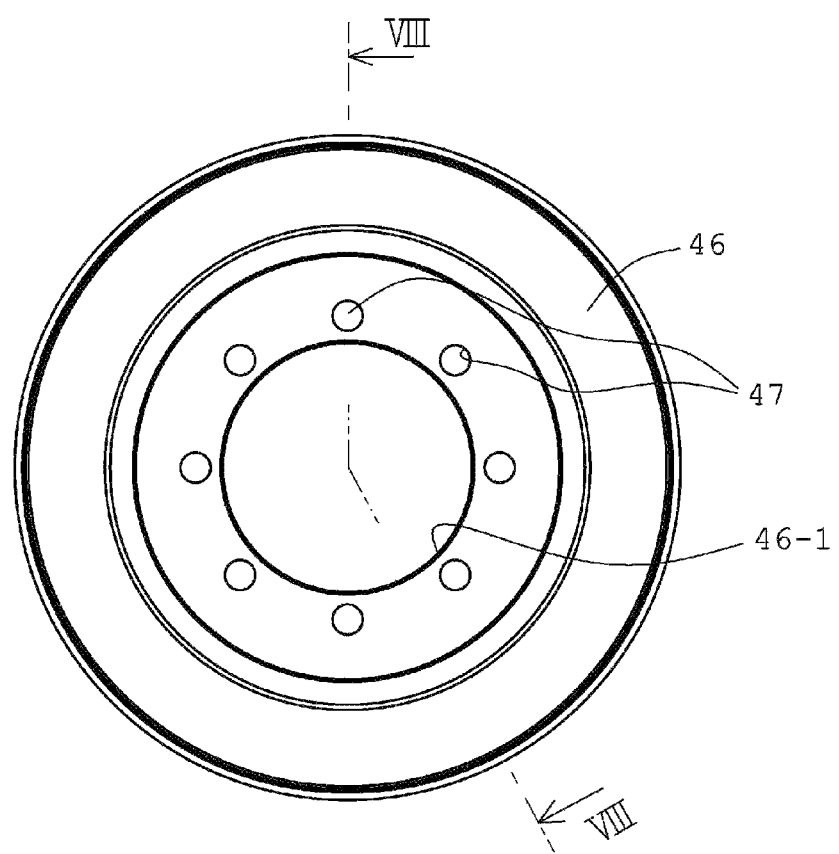
FIG. 7 is a frontal view of a separator.

The lock-up clutch 24 includes a clutch pack 36, an outer clutch drum 38 (which is coupled to the drive plate 30 by rivets 39), an inner clutch drum 40, an annular piston 42, plural return springs 44 which are disposed in a circumferential direction with an interval, a separator 46 (a friction-engagement reaction force receiving member of the present invention) having an annular disk-shape, a pilot 48 (a piston guide member of the present invention), and a hydraulic pressure chamber 50 which is formed by the piston 42, the separator 46 and the pilot 48. The pilot 48 has a function in which the piston 42 is slidably guided in an axial direction on an inner circumference thereof. In the present embodiment, a front end 48-1 has a closed bottomed cylindrical-shape (see, FIGS. 5 and 6). The pilot 48 is welded to the opening 10-1 of the cover 10 with an axial center in an entire circumference for maintaining oil-tightness of the torque converter oil in the closed chamber 13. The reference numeral 52 denotes the welded portion. A cylindrical portion 48-2 disposed at a rear end of the pilot 48 is inserted into an annular recess 25-3 of the hub damper 25 via the seal ring 54 (a groove 48-7 formed on the cylindrical portion 48-2 is to be an installing groove of the seal ring 54 as shown in FIGS. 5 and 6). A thrust bearing 56 is disposed between an opposite surface of the pilot 48 and that of the hub damper 25 in an axial direction. The cylindrical portion 48-2 of the pilot 48 has a flange portion 48-3 in an outer circumference, and the separator 46 is fixed to the flange portion 48-3 by crimping in which rivets 53 (fastening members of the present embodiment) are used. As shown in FIGS. 3 and 4, eight rivet holes 70 of the pilot 48 are formed in a circumferential direction with an equal interval. As shown in FIG. 5, the rivet holes 70, which are formed on the flange portion 48-3 of the pilot 48, have a step-wise shape in which a front end of the rivet holes 70 (a side end of the cover 10 in the general view of the torque converter) has a larger diameter. The separator 46 includes the rivet holes 47 so that the respective rivet holes 47 are aligned with the corresponding rivet holes 70 which are formed on the flange portion 48-3 of the pilot 48. As shown in FIG. 7, eight rivet holes 47 are formed on the separator 46 in a circumferential direction with an equal interval.

Figure 8:
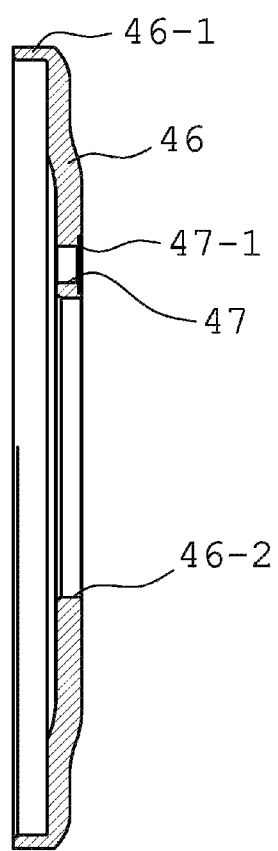
FIG. 8 is a vertical cross-sectional view of the separator (an arrow cross-sectional view taken along a line VIII-VIII of FIG. 7)

As shown in the general view of the torque converter, the rivets 53 are press-fitted from the cover 10 side into the rivet holes 70 of the flange portion 48-3 and the rivet holes 47 of the separator 46. Since the head portion 53-1 of the rivets 53 hits a bottom surface of an expanded diameter portion 70-1 which is disposed at an inlet side of the rivet holes 70 (see, FIG. 5), further press-fitting of the rivets 53 is blocked. The head portion 53-1 of the rivets 53 is abutted to an opposite inner surface of the cover 10, and the projection from the separator 46 is crimped (the reference numeral 53-3 denotes a crimped expanded diameter portion), resulting in realizing the strong fixing of the separator 46 to the pilot 48. This fixing method by crimping is described below. The rivet holes 47 of the separator 46 include a recess 47-1, which receives the crimped expanded diameter portion 53-3 of the rivets, at the rear surface side (see also, FIG. 8). As shown in FIGS. 5 and 6, the pilot 48 has a cylindrical portion 48-4, which serves as an inserting portion of a central opening 10-1 of the cover 10, at the front surface side of the flange portion 48-3, and the cylindrical portion 48-4 protrudes by a thickness of the cover 10 in front. When the cover 10 is installed in assembling the lock-up clutch, the cover 10 is flush with the welded portion of the pilot 48. The cylindrical portion 48-2 of the rear surface side of the flange portion 48-3 has slightly larger diameter at the vicinity of the flange portion 48-3, and this expanded diameter portion 48-2*a* serves as an inserting portion of the central hole 46-2 of the separator 46 in assembling the lock-up clutch.

As shown in the general view of the torque converter, the clutch pack 36 includes plural annular disk-shape drive disks 58, annular disk-shape driven disks 60 disposed between adjacent drive disks 58, clutch facings 62 which are opposite to the drive disks 58, are formed on both surfaces of the driven disks 60 and are made of a friction material (the first friction plate of the present invention includes the drive disk 58 and the clutch facing 62, and the second friction plate of the present invention includes the driven disk 60 and the clutch facing 62). Projections 58-1, which are spaced with one another in a circumferential direction of the inner circumference of the drive disk 58, are fitted into guide grooves 40-1, which are extended to a longitudinal direction and are formed in a circumferential direction with an equal interval at the outer circumference of the inner clutch drum 40. Thereby, the drive disks 58 integrally rotate with the inner clutch drum 40 and the cover 10 and slidably move in a longitudinal direction. The front end of the inner clutch drum 40 which is an annular shape has a substantially L-shape cross-section 40-2, and the substantially L-shape cross-section 40-2 is fixed to a cylindrical recess 10-2 opposite to the cover 10 by press-fitting and welding, and includes oil-holes 40-3 for the torque converter oil which serves as the clutch oil. The drive disk 58 which is the nearest to the cover 10 is opposite to the annular projections 10-3 formed on the cover 10, and enables to receive the clutch engagement reaction force by cooperating with the separator 46 when the clutch is engaged. Projections 60-1, which are spaced with one another in a circumferential direction of the outer circumference of the driven disk 60, are fitted into guide grooves 38-1, which are extended to a longitudinal direction and are plurally formed in a circumferential direction with an interval at the inner circumference of the outer clutch drum 38. Thereby, the driven disks 60 integrally rotate with the outer clutch drum 38 and slidably move in a longitudinal direction. As described above, the outer clutch drum 38 is coupled to the sub plate 31 of a torsional damper 22, which is one of the components of the transmission input axis 27, by the rivets 39. In normal operation, the return springs 44 make the piston 42 urge to a direction in which the piston 42 is separated to the cover 10, the piston is abutted to the separator 46 at an abutment portion 42-3, and the clutch pack 36 becomes a non-engagement state by oil film of the torque converter oil serving as the clutch oil, which exists between the drive disks 58 and the clutch facings 62. By introducing piston operation oil to the hydraulic pressure chamber 50, the piston 42 moves toward the cover 10 against the return springs 44 (moves to leftward in the general view of the torque converter). The clutch pack 36 sandwiches between the cylindrical driving portion 42-1 of the piston 42 and the annular projections of the cover 10, the drive disks 58 engage with the driven disks 60 via the clutch facings 62, and then the lock-up clutch becomes the engagement state. Thus, in the present embodiment, in order that the lock-up clutch 24 becomes the engagement state, the piston 42 moves toward the cover 10. This movement is the same as that of Patent Document 3 and is different from those of Patent Documents 1 and 2 in which the clutch becomes the engagement state by making the piston move in the separation direction to the cover 10.

The inner circumference side of the piston 42 slidably fits the outer circumference of the flange portion 48-3 at an outer circumference of the pilot 48 in an axial direction via the seal ring 64, and the outer circumference side of the piston 42 inserts into the axial direction cylindrical projection portion 46-1 of the outer circumference of the separator 46 (see, FIG. 8) via the seal ring 68. The movement of the piston 42 toward the cover 10, which makes the lock-up clutch 24 become the engagement state, is performed by introducing the operation oil pressure to the hydraulic pressure chamber 50 which is constituted by the piston 42, the separator 46 and the pilot 48.

The pilot 48 includes passage holes for introducing the operation oil to the hydraulic pressure chamber 50, passage holes for circulating the torque converter oil and press-fitting holes of the rivets 53 for fixing the separator 46 to the cover. These hole structures of the pilot 48 will be described. The eight rivet holes 70 for press-fitting the rivets 53 into the flange portion 48-3 in an outer circumference of the pilot 48 are formed on the flange portion 48-3 in a circumferential direction with an equal interval, as shown in FIGS. 3 and 4. As shown in FIGS. 5 and 6, the pilot 48 includes the central hole 48-6 whose front portion is closed. The inner circumferential surface 48-6a of the open end surface side of the central hole 48-6 is a taper surface, and the torque converter oil holes 72 are opened to this taper surface 48-6a. The eight torque converter oil holes 72 are formed on the flange portion 48-3 in a circumferential direction with an equal interval, as shown in FIG. 3. As shown in FIGS. 5 and 6, the torque converter oil holes 72 are extended toward the front end portion 48-1 in inclination to an outer circumference side, and are opened to the corresponding rivet holes 70 in proximity to a circumferential direction at the recesses 48-3a which are located on the front surface of the flange portion 48-3 (see, FIG. 3). In the general view of the torque converter, these openings are denoted by "P". The outer surface of an inner circumference of the piston 42 is opposite to the cover 10 at these openings "P", and the torque converter oil communicates between the torque converter oil holes 72 of the pilot 48 and the closed chamber 13. The number of the lock-up clutch operation oil holes 74 is also eight (see, FIG. 4), and as shown in FIG. 6, the lock-up clutch operation oil holes 74 are extended from the inner circumferential holes of the pilot 48 toward the rear end surface side in inclination to an outer circumference side (the inclination from the inner side holes of the pilot 48 toward an outer circumference is the same as that of the oil holes 72, but the inclination direction toward the rear end surface side in the holes 74 is opposite to the inclination direction toward the front end surface side in the holes 72). The lock-up clutch operation oil holes 74 are opened to the corresponding rivet holes 70 in proximity to a circumferential direction at the recesses 48-3b which are located on the rear surface of the flange portion 48-3. In the general view of the torque converter, these openings are denoted by "Q" and are an inner circumferential portion of the hydraulic pressure chamber 50. Thereby, the lock-up clutch operation oil enables to communicate with (flow into) the hydraulic pressure chamber 50. In the general view of the torque converter, the openings of the lock-up clutch operation oil holes 74 are separated to the openings of the torque converter oil holes 72 on an inner circumferential surface of the central hole 48-6 of the pilot 48 in a direction of the closed front end side 48-1 of the pilot 48, and a seal ring 76 is disposed between the openings of the lock-up clutch operation oil holes 74 and the openings of the torque converter oil holes 72. The front surface portion 27-2 of the transmission input axis 27 is extended beyond the seal ring 76. Thereby, the operation oil pressure spaces 78 in front of the seal ring 76 and the torque converter oil spaces 80 in the rear of the seal ring 76 are separately formed. In each of the operation oil pressure spaces 78, the central oil passage 82 of the transmission input axis 27 and the lock-up clutch operation oil hole 74 are opened. In each of the torque converter oil spaces 80, the torque converter oil hole 72 is opened. An installing groove of the seal ring 76 is denoted by the reference numeral 48-8 in FIGS. 5 and 6.

Next, in the present embodiment, circulation flow of the torque converter oil will be described. The torque converter oil is flown into the outer annular passage of the stator shaft 29 shown in an arrow $f_1$, into the spline hole 25-1 of the hub damper 25 from stator shaft 29 shown in an arrow $f_2$ and into the torque converter oil space 80. The torque converter oil is flown into the oil holes 72 from the torque converter oil space 80 (an arrow $f_3$) and into the clutch pack 36 from the oil holes 72 shown in an arrow $f_4$. Then, the closed chamber 13 is filled with the torque converter oil, resulting in supplying the torque converter oil into the torque converter. The torque converter oil from the torque converter is returned to the outer annular passage of the stator shaft 29 which is opposite to the flow-into side shown in an arrow $f_5$ and whose direction is reversed against the direction of the flow-into side (an arrow $f_6$). The flow-into outer annular passage (the arrow $f_1$ side) is separated to the flow-out outer annular passage by a not-shown means.

As described above, with respect to the lock-up clutch operation oil, the transmission input axis 27 has the operation oil holes 82 with an axial center, the respective operation oil holes 82 are opened to the corresponding operation oil pressure space 78, and the operation oil pressure spaces 78 are opened to the hydraulic pressure chamber 50, resulting in applying the operation oil pressure to the piston.

The operation of the lock-up clutch 24 according to the present invention is the same as that of the normal lock-up clutch. Since the operation oil pressure of the hydraulic pressure chamber 50 is low in a non-lock-up state, the piston 42 is abutted to the separator 46 by the return springs 44, the clutch pack 36 becomes a non-engagement state by the oil film between the drive disks 58 and the clutch facings 62 on the driven disks 60, and the rotation of the crank shaft of the engine is transferred to the transmission input axis 27 by fluid power transmission by means of the torque converter. That is, the flow of the operation oil, which is transformed from the cover 10 to the impeller shell 12 and is generated by the rotation of the pump impeller 14, is introduced to the turbine blade 16 via the stator 18, resulting in circulating the operation oil to the pump impeller 14. The rotation of the turbine blade 16 generated from the circulating flow of such an operation oil is transferred to the transmission input axis 27 via the turbine shell 15, the sub plate 31 and the drive plate 30 of the torsional damper 22, the coil springs 33, the hub plate 32 and the hub damper 25.

In a lock-up operation state, the operation oil is introduced to the hydraulic pressure chamber 50 via the oil holes 82 of the transmission input axis 27 with an axial center and the oil holes 74 of the pilot 48, the operation oil pressure of the hydraulic pressure chamber 50 is increased, the piston 42 is driven toward the cover 10 against the return springs 44, and the drive disks 58 are engaged with the clutch facings 62 on the driven disks 60 in the clutch pack 36, resulting in transiting the clutch pack 36 to an engagement state. The engagement of the clutch is directly performed by sandwiching and fixing between the piston 42 and the cover 10 in the clutch pack 36 by friction, and the engagement reaction force of the clutch is received by the cooperation with the projections 10-3 of the cover 10 and the separator 46. That is, the engagement reaction force of the clutch is received by the projections 10-3 of the cover 10 at one side of the clutch pack 36 and by the separator 46 at the other side (at the opposite side) of the clutch pack 36 via the piston 42 and the hydraulic pressure chamber 50. By the engagement of the clutch, the rotation of the crank shaft of the engine is transferred from the cover 10 to the inner side clutch drum 40, the clutch pack 36 and the outer side clutch drum 38 in the lock-up clutch 24, and is also transferred from the outer side clutch drum 38 to the hub damper 25, that is, the transmission input axis 27 via the drive plate 30, the coil springs 33 and the hub plate 26 in the torsional damper 22. In this time, the impeller 14, the turbine 16 and the stator 18 in the torque converter co-rotates the cover 10 with the same rotational velocity, the power transmission function by the torque converter is not generated, and the mechanical power transmission is only generated.

As described above, both in the fluid power transmission operation by the torque converter in which the lock-up clutch 24 is the non-engagement state and in the mechanical power transmission operation in which the lock-up clutch 24 is the engagement state, when the relative fluctuation (the rotation fluctuation) in the rotational angle of the output side (the hub plate 32) of the torsional damper 22 to the input side (the drive plate 30 and the sub plate 31) of the torsional damper 22 is occurred, the coil springs 33 are pressed by the hub plate 32 at the rotational fluctuation direction side end, resulting in suppressing the rotational fluctuation by the resistance by means of the elastic deformation.

Figure 9A:
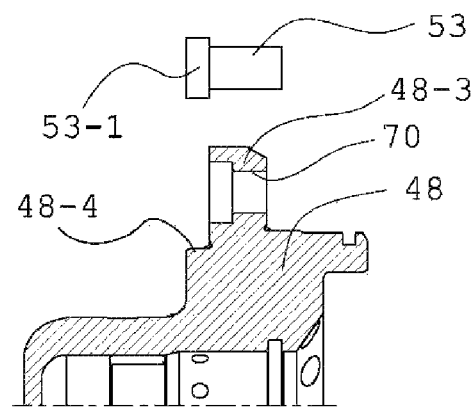
FIGS. 9A, 9B and 9C are an explaining diagram of assembling processes (a), (b) and (c) of a lock-up clutch according to the first embodiment of the present invention, respectively.

In the above-described embodiment, an assembling process of the lock-up clutch will be described. FIG. 9A shows a preparing state of the pilot 48 and the rivet 53.

Figure 9B:
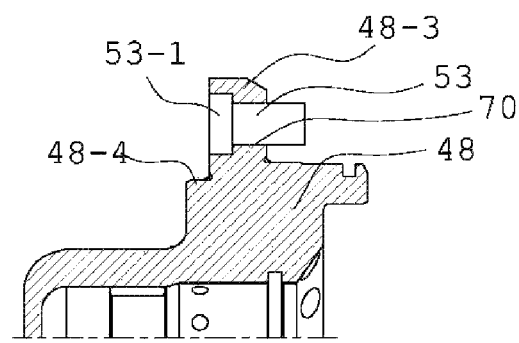

Next, in a process of (b) (FIG. 9B), the rivet 53 is press-fitted into the step-wise rivet hole 70 in the flange portion 48-3 of the pilot 48, and the head portion 53-1 of the rivet 53 is flush with the flange portion 48-3 of the pilot 48.

In a process of (c) (FIG. 9C), the cover 10, which includes the welded boss nut 28 and is press-fitted and is fixed the inner side clutch drum 40 to the recess 10-2 by welding, is inserted into the cylindrical portion 48-4 of the front surface of the pilot 48 in the central hole 10-1. Thereby, the cover 10 is abutted to the head portion 53-1 of the rivet 53 which is press-fitted into the front surface of the flange portion 48-3 of the pilot 48 and the rivet hole 70. Then, a joint between the inner portion of the central hole 10-1 of the cover 10 and the cylindrical portion 48-4 of the front surface of the pilot 48 is welded in an entire circumference. The reference numeral 52 denotes the welded portion after welding.

In a process of (d) (FIG. 10A), the drive disks 58 in the clutch pack 36 are installed in the inner side clutch drum 40. Next, in a state that the piston 42 is disposed at an inner portion and the seal ring 64 and 68 is disposed in the inner and outer circumference, the separator 46 is disposed at the central hole 46-2 via the return springs 44, and the rivet 53 is inserted into the expanded diameter portion 48-2a of the cylindrical portion 48-2 of the pilot 48 (see, FIGS. 5 and 6), and is protruded from the rivet hole 70 of the separator 46. The above process is performed for preparing the crimping of the projection portion 53-2, which is performed in a subsequent process. In the subsequent crimping process, a die of a dedicated crimping apparatus (a crimper) is disposed at the cover 10 side via the head portions 53-1 of the rivets 53, and the projection portions 53-2 from the rivet holes 70 of the separator 46 are crimped by punches of the crimper which is opposite to the die and whose number is the same as that of the rivets 53. The above process is the crimping process, and the materials from the rivets 53 by crimping are flown toward the recess 47-1 of the separator 46.

Figure 10A:
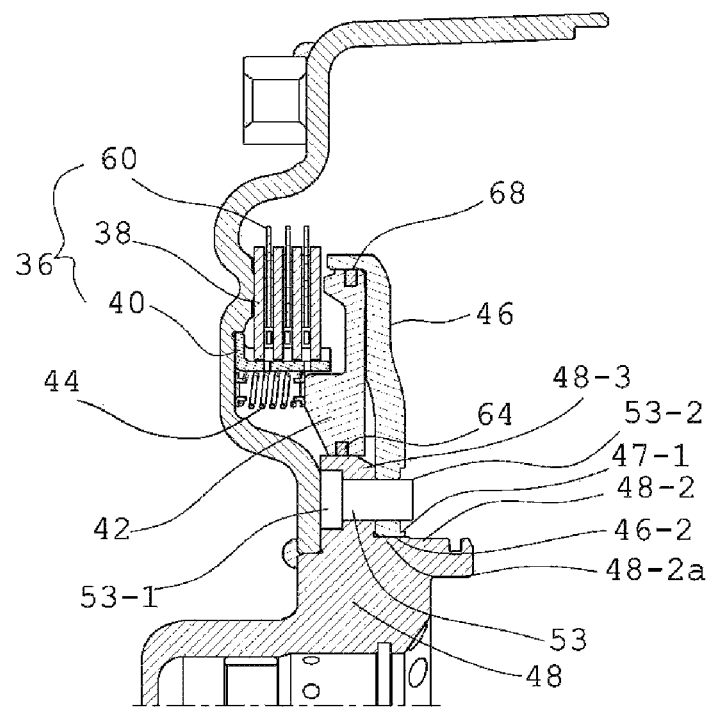
FIGS. 10A and 10B are an explaining diagram of the processes (d) and (e) which are subsequent to the processes shown in FIGS. 9A to 9C, respectively.
Figure 10B:
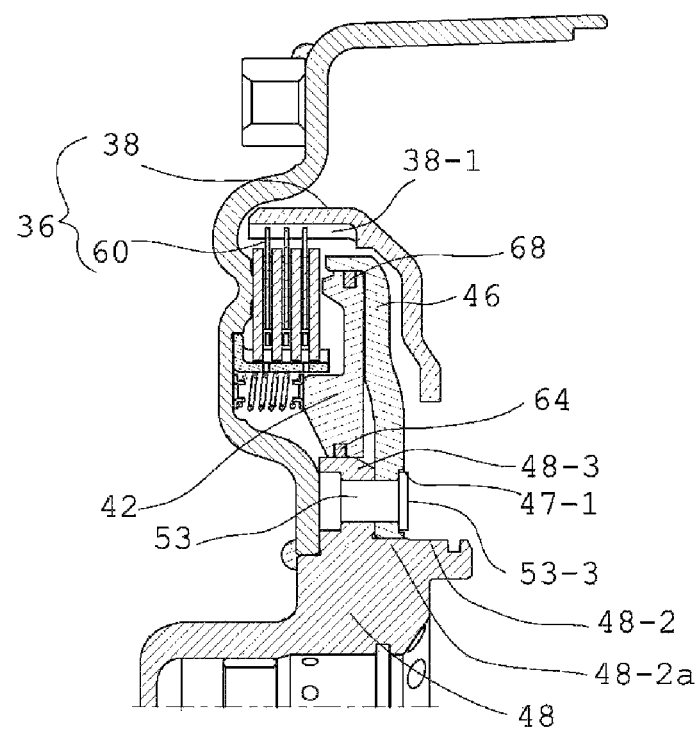

The crimped portion (the expanded diameter portion) 53-3 generated by performing the crimping process of the rivets 53 is shown in FIG. 10B in which a final process of (e) is illustrated. As the final process of assembling the lock-up clutch, the outer clutch drum 38 of the clutch pack 36 is installed so that the guide grooves 38-1 of the outer clutch drum are engaged with the driven disks 60. In the subsequent process of assembling the torsional damper 22, as shown in FIG. 2, the outer clutch drum 38 is coupled to the drive plate 30 by the rivets 39, and then the process is progressed to the assembling process in the next stage such as assembling the torque converter portion.

In the assembling method shown in FIGS. 9A to 10B, in a state that the rivets 39 are inserted into the rivet holes 70 formed on the pilot 48 and the rivet holes 47 formed on the separator 46, and the piston 42, the seal ring 64 and 68, the drive plates 38 and the driven plates 60 are sandwiched between the cover 10 and the separator 46, the pilot 48 is fixed to the separator 46 by crimping the rivets 39. In the process prior to the process in which the pilot 48 is fixed to the separator 46 by crimping the rivets 39, in a state that the respective head portions of the rivets 39 are press-fitted into the corresponding rivet holes 70 formed on the pilot 48 and are abutted to the cover, the pilot 48 is fixed to the cover 10. Further, after the pilot 48 is fixed to the cover 10, the seal ring 64 is in contact with the pilot 48. After the seal ring 64 and 68 is in contact with the pilot 48 (the piston guide member), the pilot 48 (the piston guide member) is fixed to the separator 46 (the friction-engagement reaction force receiving portion) by crimping (by fixing with no heat). Thus, no heat is transferred to the seal ring 64 and 68 by the fixing operation, and the strong fixed state between the pilot 48 and the separator 46 is realized.

Since the pilot 48 (the piston guide member) is fixed to the cover 10 in a state that the head portions 53-1 of the rivets (the fastening members) are abutted to the cover 10 after the respective head portions 53-1 of the rivets 53 (the fastening members) are press-fitted into the corresponding rivet holes 70 (the holes) formed on the pilot 48 (the piston guide member), the fastening of the rivets 53 (the fastening members) becomes strong. Thereby, when assembling other members such as the first and second friction plates 50 and 60, the seal ring 64 and 68 and the piston 42, to the lock-up clutch, it is not concerned that the rivets 53 (the fastening members) are dropped.

Further, the seal ring 64 and 68 is in contact with the pilot 48 (the piston guide member) after the pilot 48 (the piston guide member) is fixed to the cover 10. That is, since the seal ring 64 and 68 is not in contact with the pilot 48 (the piston guide member) when the pilot 48 (the piston guide member) is fixed to the cover 10, the fixing method in which the pilot 48 (the piston guide member) is fixed to the cover 10 can freely be selected. For example, the welding which is a strong fixing method as described in the present embodiment can be used in fixing the pilot 48 (the piston guide member) to the cover 10.

Figure 11A:
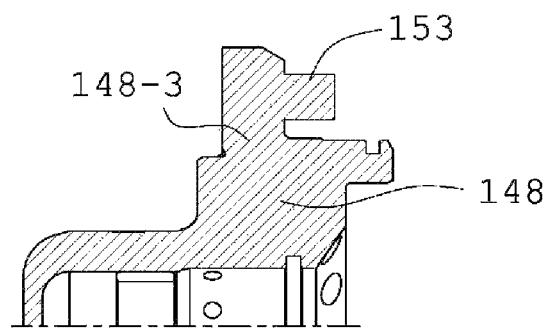
FIGS. 11A and 11B are an explaining diagram of assembling processes (a) and (b) of a lock-up clutch according to another embodiment of the present invention, respectively.

In the above-described embodiment, as the fastening member of the present invention, rivet-like projections for attaching the separator 46 to the pilot 48 can integrally be formed on the pilot 48. The above configuration will be described as the second embodiment, and the assembling process will also be explained by using FIGS. 11A to 12B. The pilot 148 used in the second embodiment is shown in FIG. 11A. The pilot 148 includes the rivet-like projections 153 (the fastening members in the second embodiment) which are integrated with the pilot 148 and are protruded to the pilot central hole opening end side (the separation side to the cover 10 in the general view of the torque converter) in the flange portion 148-3.

Figure 9C:
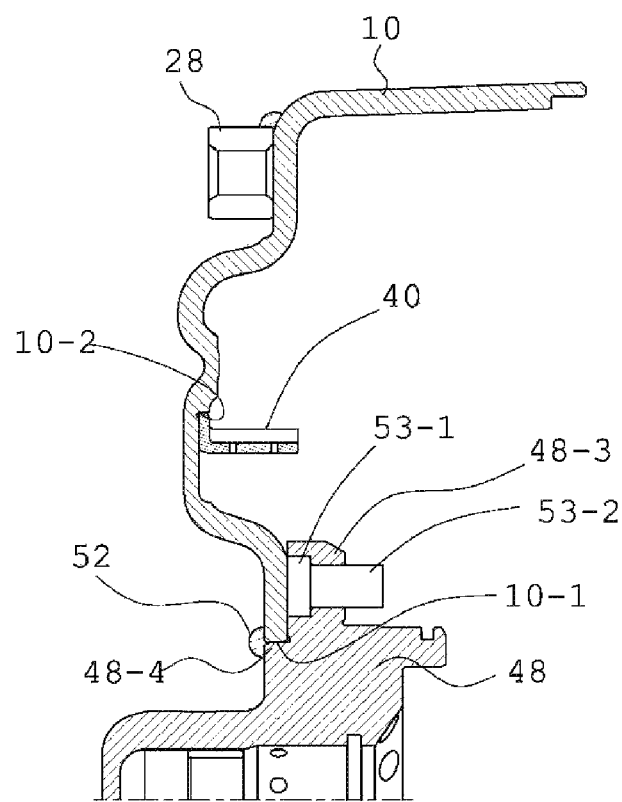
Figure 11B:
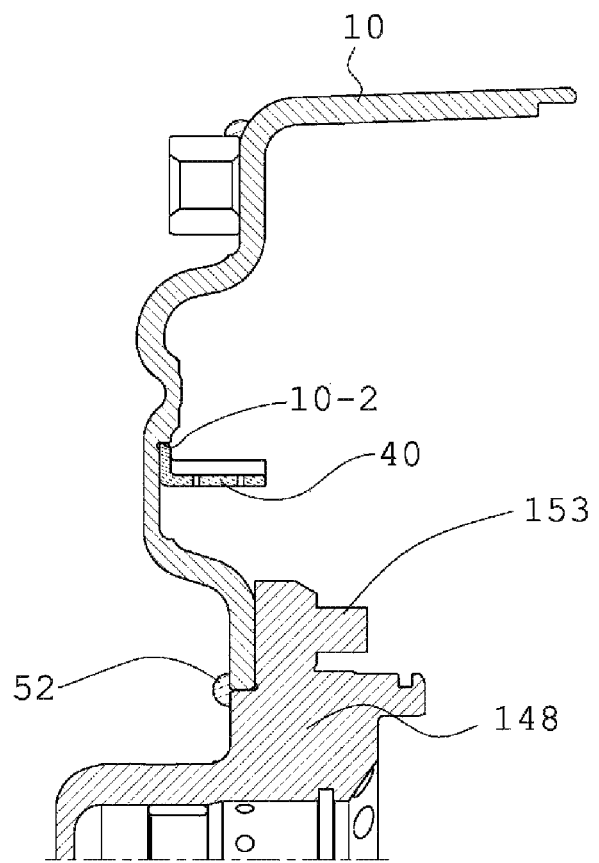

The state shown in FIG. 11B is the same as the state shown in FIG. 9C which is illustrating the assembling process of (c) in the first embodiment. The welded portion is shown by the reference numeral 52. The inner side clutch drum 40 is press-fitted into and is welded to the recess 10-2 of the cover 10.

Figure 12A:
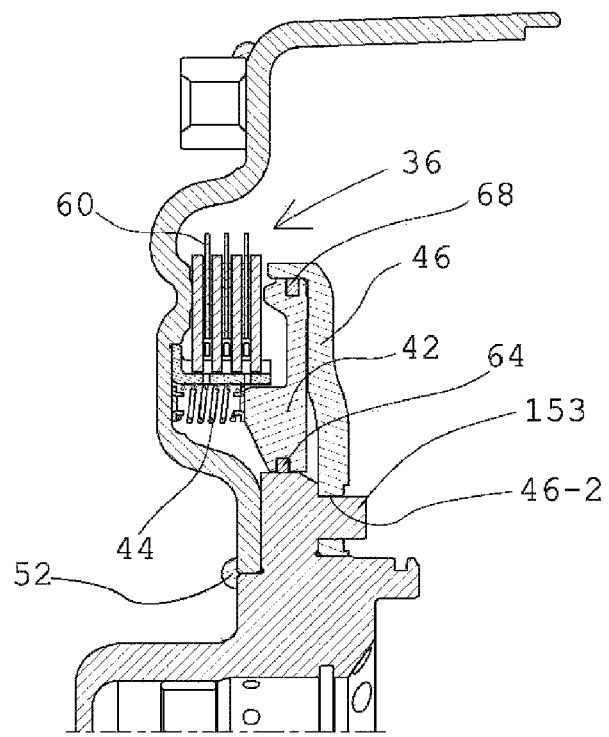
FIGS. 12A and 12B are an explaining diagram of the processes (c) and (d) which are subsequent to the processes shown in FIGS. 11A and 11B, respectively.

The next assembling process is shown in FIG. 12A and is the same as the assembling process of (d) in the first embodiment (FIG. 10A). The clutch pack 36 excluding the outer side clutch drum 38, the piston 42, the return springs 44, the separator 46, and the seal ring 64 and 68 are assembled to the pilot 148. In a state that the above components were assembled to the pilot 148, the end of the rivet-like projections 153 is protruded from the central hole 46-2 of the separator 46.

Figure 12B:
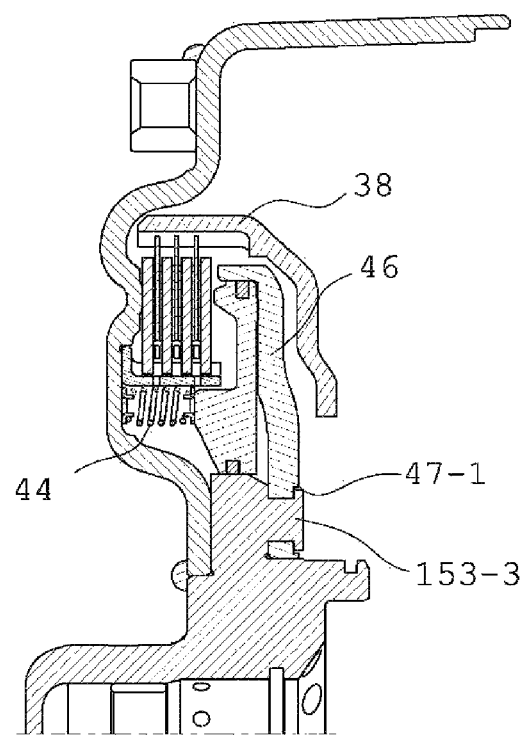

The assembling process (d) shown in FIG. 12B is the same as the assembling process shown in FIG. 10B of the first embodiment. The crimped portions 153-3 are formed by crimping the respective ends of the rivet-like projections 153 protruded from the separator 46 under adding the pressure, and the materials generated by crimping are received in the recess 47-1 of the separator 46. Next, the outer side clutch drum 38 of the clutch pack 36 is assembled to the pilot 148, and then the assembling operation of the torque converter portion is performed. In the second embodiment, since the rivet-like projections 153 are integrated with the pilot 148, a decrease in the number of the components can be achieved, and the press-fitting process to the pilot 148 is not needed. The second embodiment of the present invention has the advantages in which the number of the components and the man-hour are reduced.

EXPLANATION OF REFERENCE NUMERALS 10 cover
  10-1 central opening of cover
12 impeller shell
13 closed chamber
14 pump impeller
16 turbine blade
18 stator
20 one-way clutch
22 torsional damper
24 lock-up clutch
25 hub damper
27 transmission input axis
29 stator shaft
36 clutch pack
38 outer side clutch drum
40 inner side clutch drum
  40-3 oil hole of inner side clutch drum
42 piston
44 return spring
46 separator (friction-engagement reaction force receiving member of the present invention)
47 rivet hole of separator
48, 148 pilot (piston guide member of the present invention)
50 hydraulic pressure chamber
52 welded portion between cover and pilot
53 rivet (fastening member of the present invention)
  53-1 rivet head portion
  53-3 crimped portion to rivet
58 drive disk
60 driven disk
62 clutch facing (the first friction plate constituted by a drive disk and a clutch facing; and the second friction plate constituted by a driven disk and a clutch facing)
70 rivet hole of pilot
72 torque converter oil hole of pilot
74 lock-up clutch operation oil hole of pilot
78 operation oil pressure space
80 torque converter oil space
82 clutch operation oil passage
153 rivet-like projection (fastening member of the present invention)
  153-3 crimped portion of rivet-like projection integrated with pilot

The invention claimed is:

1. A lock-up clutch for a torque converter that is installed in a closed chamber which is defined by an impeller shell of said torque converter and a cover, which is fixed to said impeller shell and integrally rotates with an engine output axis, and circulates power transmission oil, and transfers a rotation of said engine output axis to an input axis side of a transmission in bypassing said torque converter, comprising:
  a piston;

first friction plates that integrally rotate with said cover;
second friction plates that are integrally and rotatably coupled to said input axis side of said transmission, are opposite to said first friction plates in an axial direction, and are not engaged with said first friction plates in a normal state;
an annular hydraulic pressure chamber that integrally rotates with said cover, is formed on one surface of said piston, and urges said first and second friction plates against one another to be a friction engagement state by driving said piston by means of hydraulic pressure;
a piston guide member that integrally rotates with said cover, is a cylindrical shape, and forms oil holes which slidably guide said piston in said axial direction at an inner circumferential thereof, and are communicated said annular hydraulic pressure chamber with a hydraulic pressure source;
a seal ring on the inner circumference of the piston that is in close contact with said piston and said piston guide member;
a friction-engagement reaction force receiving member that rotates with said cover, is a cylindrical shape, is opposite to said cover sandwiching said piston, a seal ring on an outer circumference of the piston, said first and second friction plates, and receives a friction-engagement reaction force between said first and second friction plates in cooperation with said cover when said piston is driven by said hydraulic pressure in said hydraulic pressure chamber; and
fastening members that are plurally disposed in a circumferential direction with an interval, and are fixed with said piston guide member and said friction-engagement reaction force receiving member by crimping,
wherein said piston guide member is fixed to said cover,
wherein said friction-engagement reaction force receiving member is fixed to said cover via said piston guide member by crimping said fastening members,
wherein said fastening members are rivets that are press-fitted into rivet holes formed on said piston guide member and rivet holes formed on said friction-engagement reaction force receiving member,
wherein an end of an engine side of said piston guide member has a closed bottomed shape, and
wherein said piston guide member includes a welded portion between an opening of said cover and an outer circumferential portion of said piston guide member in an entire circumference to form a closed space and fix said piston guide member to said cover.

2. The lock-up clutch for the torque converter according to claim 1, wherein a head portion of said rivets is located to a cover side.

3. The lock-up clutch for the torque converter according to claim 1, wherein said friction-engagement reaction force receiving member has an axial direction cylindrical projection portion in an outer circumference, is slide with an outer circumference of said piston at said axial direction cylindrical projection portion in said outer circumference via said seal ring on the outer circumference of the piston and serves as a separator in which said hydraulic pressure chamber is defined by said piston and said piston guide member, and
wherein said piston is driven toward said cover by said hydraulic pressure of said hydraulic pressure chamber, resulting in having said friction-engagement reaction force.

4. The lock-up clutch for the torque converter according to claim 1, wherein said an engine output axis side end of a transmission input axis includes a sealing member that is extended to an inside space of said piston guide member and is disposed between said engine output axis side end of said transmission input axis and an opposite surface of said piston guide member,
wherein said inside space of said piston guide member is partitioned into a first room that is located at a cover side from said sealing member and a second room that is located at said transmission input axis side, and said piston guide member includes plural operation oil holes and plural torque converter oil holes in said circumferential direction with an interval, and
wherein said first room is communicated with said hydraulic pressure chamber by said operation oil holes, and said second room is communicated with a proximity portion of a clutch unit in said closed chamber by said torque converter oil holes.

5. A method for fixing said piston guide member to a said friction-engagement reaction force receiving member in the lock-up clutch for the torque converter according to claim 1,
welding said opening of said cover to said outer circumferential portion of said piston guide member in said entire circumference in a state that respective tips of said rivets are protruded from said piston guide member to a cover separation side;
disposing said first and second friction plates, which are relatively positioned, between said cover and said piston;
press-fitting said respective tips of said rivets into said corresponding rivet holes of said friction-engagement reaction force receiving member; and
fixing said piston guide member to said friction-engagement reaction force receiving member by crimping said respective tips of said rivets that are protruded from said friction-engagement reaction force receiving member.

6. The method for fixing said piston guide member to said friction-engagement reaction force receiving member in the lock-up clutch for the torque converter according to claim 5, wherein respective head portions of said rivets are abutted to said piston guide member through said corresponding rivet holes of said piston guide member and said rivets are press-fitted into said piston guide member so that said respective tips of said rivets are protruded to a friction-engagement reaction force receiving member side.

7. The method for fixing said piston guide member to said friction-engagement reaction force receiving member in the lock-up clutch for the torque converter according to claim 5, wherein said friction-engagement reaction force receiving member has an axial direction cylindrical projection portion in an outer circumference, is slide with the outer circumference of said piston at said axial direction cylindrical projection portion in said outer circumference via said seal ring on the outer circumference of the piston and serves as a separator in which said hydraulic pressure chamber is defined by said piston and said piston guide member, and
wherein said piston is driven toward said cover by said hydraulic pressure of said hydraulic pressure chamber, resulting in having said friction-engagement reaction force.

8. A lock-up clutch for a torque converter that is installed in a closed chamber which is defined by an impeller shell of said torque converter and a cover, which is fixed to said impeller shell and integrally rotates with an engine output axis, and circulates power transmission oil, and transfers a rotation of said engine output axis to an input axis side of a transmission in bypassing said torque converter, comprising:
- a piston;
- first friction plates that integrally rotate with said cover;
- second friction plates that are integrally and rotatably coupled to said input axis side of said transmission, are opposite to said first friction plates in an axial direction, and are not engaged with said first friction plates in a normal state;
- an annular hydraulic pressure chamber that integrally rotates with said cover, is formed on one surface of said piston, and urges said first and second friction plates against one another to be a friction engagement state by driving said piston by means of hydraulic pressure;
- a piston guide member that integrally rotates with said cover, is a cylindrical shape, and forms oil holes which slidably guide said piston in said axial direction at an inner circumference thereof, and are communicated said annular hydraulic pressure chamber with a hydraulic pressure source;
- a seal ring on the inner circumference of the piston that is in close contact with said piston and said piston guide member;
- a friction-engagement reaction force receiving member that rotates with said cover, is a cylindrical shape, is opposite to said cover sandwiching said piston, a seal ring on an outer circumference of the piston, said first and second friction plates, and receives a friction-engagement reaction force between said first and second friction plates in cooperation with said cover when said piston is driven by said hydraulic pressure in said hydraulic pressure chamber; and
- fastening members that are plurally disposed in a circumferential direction with an interval, and are fixed with said piston guide member and said friction-engagement reaction force receiving member by crimping, wherein said piston guide member is fixed to said cover,
wherein said friction-engagement reaction force receiving member is fixed to said cover via said piston guide member by crimping said fastening members,
wherein said fastening members are formed on said piston guide member and are integral-molded portions protruded in a separation direction to said cover,
wherein said protruded integral-molded portions are press-fitted into rivet holes of said friction-engagement reaction force receiving member,
wherein an end of an engine side of said piston guide member has a closed bottomed shape, and
wherein said piston guide member includes a welded portion between an opening of said cover and an outer circumferential portion of said piston guide member in an entire circumference to form a closed space and fix said piston guide member to said cover.

9. The lock-up clutch for the torque converter according to claim 8, wherein said friction-engagement reaction force receiving member has an axial direction cylindrical projection portion in an outer circumference, is slide with an outer circumference of said piston at said axial direction cylindrical projection portion in said outer circumference via said seal ring on the outer circumference of the piston and serves as a separator in which said hydraulic pressure chamber is defined by said piston and said piston guide member, and wherein said piston is driven toward said cover by said hydraulic pressure of said hydraulic pressure chamber, resulting in having said friction-engagement reaction force.

10. A method for manufacturing a lock-up clutch for a torque converter that comprises a piston; first friction plates which are fixed to an impeller shell and integrally rotate with a cover;
- second friction plates which are opposite to said first friction plates; a piston guide member which slidably guides said piston in an axial direction at an inner circumference thereof;
- a seal ring on the inner circumference of the piston which is in close contact with said piston and said piston guide member; a friction-engagement reaction force receiving member which is opposite to said cover sandwiching said piston, a seal ring on an outer circumference of the piston, said first and second friction plates; and fastening members which are inserted into holes which are disposed on said piston guide member and holes which are disposed on said friction-engagement reaction force receiving member, comprising:
- inserting said fastening members into said holes which are disposed on said piston guide member and said holes which are disposed on said friction-engagement reaction force receiving member;
- fixing said piston guide member to said friction-engagement reaction force receiving member by crimping said fastening members in a state that said piston, said seal ring on the outer circumference of the piston, and said first and second friction plates are sandwiched between said cover and said friction-engagement reaction force receiving member; and
- fixing said piston guide member to said cover in a state that head portions of said fastening members are abutted to said cover after said head portions of said fastening members are press-fitted into said holes which are disposed on said piston guide member, before fixing said piston guide member to said friction-engagement reaction force receiving member by crimping said fastening members.

11. The method for manufacturing the lock-up clutch for the torque converter according to claim 10, wherein said seal ring on the inner circumference of the piston is in close contact with said piston guide member after fixing said piston guide member to said cover.

12. The method for manufacturing the lock-up clutch for the torque converter according to claim 10, wherein said friction-engagement reaction force receiving member has an axial direction cylindrical projection portion in an outer circumference, is slide with the outer circumference of said piston at said axial direction cylindrical projection portion in said outer circumference via said seal ring on the outer circumference of the piston and serves as a separator in which said hydraulic pressure chamber is defined by said piston and said piston guide member, and wherein said piston is driven toward said cover by said hydraulic pressure of said hydraulic pressure chamber, resulting in having said friction-engagement reaction force.

* * * * *